United States Patent
Yonemitsu (10) Patent No.: US 7,023,772 B2
(45) Date of Patent: Apr. 4, 2006

(54) LASER POWER SETTING METHOD AND OPTICAL RECORDING DEVICE

(75) Inventor: Tetsumasa Yonemitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 10/493,258

(22) PCT Filed: Aug. 22, 2003

(86) PCT No.: PCT/JP03/10654

§ 371 (c)(1),
(2), (4) Date: Apr. 21, 2004

(87) PCT Pub. No.: WO2004/019324

PCT Pub. Date: Mar. 4, 2004

(65) Prior Publication Data

US 2005/0007908 A1    Jan. 13, 2005

(30) Foreign Application Priority Data

Aug. 23, 2002 (JP) .............................. 2002-243826

(51) Int. Cl.
*G11B 7/00* (2006.01)
(52) U.S. Cl. .................. 369/47.52; 369/53.31
(58) Field of Classification Search ............ None
See application file for complete search history.

(56) References Cited

U.S. PATENT DOCUMENTS

| | | | |
|---|---|---|---|
| 5,072,435 A | | 12/1991 | Bakx |
| 5,274,622 A | * | 12/1993 | Kono .................... 369/116 |
| 5,898,655 A | | 4/1999 | Takahashi |
| 5,940,505 A | * | 8/1999 | Kanamaru .................. 705/58 |
| 6,243,796 B1 | * | 6/2001 | Otsuka ..................... 711/163 |
| 6,347,065 B1 | * | 2/2002 | Fleming, III ............. 369/30.2 |
| 6,947,362 B1 | * | 9/2005 | Sako et al. ............. 369/53.21 |

FOREIGN PATENT DOCUMENTS

| | | |
|---|---|---|
| EP | 0 442 566 | 2/1991 |
| EP | 0 751 509 | 1/1997 |
| EP | 1 026 669 | 8/2000 |
| JP | 4-214208 | 8/1992 |
| JP | 7-93754 | 4/1995 |
| JP | 9-16964 | 1/1997 |
| JP | 2000-293857 | 10/2000 |

* cited by examiner

*Primary Examiner*—Thang V. Tran
(74) *Attorney, Agent, or Firm*—Frommer Lawrence & Haug LLP; William S. Frommer (57) ABSTRACT

At ST1, the process identifies whether apparatus identification information of an optical recording apparatus is recorded in an optical recording medium and, if it is not recorded, if the recorded information does not agree with apparatus identification information of the optical recording apparatus, or if they agree but information validation conditions are not met, it performs processing of ST2 and ST3 to perform power calibration processing of laser light and calculate power set values. At ST4, the process records power calibration information and the apparatus identification information in the recording medium. If the information agrees and the information validation conditions are met, the process performs processings of ST9 and ST10 to calculate power set values using already created information. At ST5, the process sets laser light power based on the power set values. If a recording medium, which has once been used, is used, recording of a signal can start immediately in a condition where the laser light power is optimized.

20 Claims, 4 Drawing Sheets

LASER POWER SETTING METHOD AND OPTICAL RECORDING DEVICE

This application is a 371 of PCT/JP03/10654 Aug. 22, 2003

TECHNICAL FIELD

The present invention relates to a laser power setting method and an optical recording apparatus.

BACKGROUND ART

In an optical recording apparatus using an optical recording medium, a disc is irradiated with laser light sent from an optical pickup so that a signal may be recorded on the disc. Further, power of the laser light is switched to read the signal recorded on the disc.

In such an optical recording apparatus, power of laser light is controlled to irradiate a disc with the laser light so that pits corresponding to a signal to be recorded may be formed in the disc. In this case, if the power of the laser light is not appropriate, a shape of the pits may be too large or too small, thus making it impossible to read the recorded signal correctly. Therefore, performed is so-called power calibration processing such that trial writing is performed utilizing, for example, a region on an innermost side or an outermost side of the disc and based on a result of this trial writing, the laser light power may be set optimally.

Note here that in the power calibration processing, a signal is recorded in a region on the innermost or outermost side with power of laser light altering and, based on a reproduced signal obtained by reproducing the recorded signal, optimal laser light power is determined. Therefore, this requires time for recording a signal, time for reproducing the recorded signal to determine laser light power, a movement time for moving an optical pickup between the innermost side and the outermost side, etc., and thus, it takes long time required for processing.

Therefore, if power calibration processing is performed to set laser light power to an optimal state when a removable disc is mounted to an optical recording apparatus, an operation to record a signal cannot be started until the power calibration processing is completed. If a buffer memory is provided to record a signal supplied during power calibration processing when it takes a long time to perform the power calibration processing, a large capacity buffer memory must be provided, thus increasing costs of a relevant optical recording apparatus.

DISCLOSURE OF THE INVENTION

It is an object of the present invention to provide a laser power setting method and an optical recording apparatus in which recording of a signal may start immediately without requiring a buffer memory and a signal may be recorded in a condition where laser light power is optimized.

A laser power setting method related to the present invention comprises a first identification step for identifying whether apparatus identification information assigned to an optical recording apparatus is recorded in an optical recording medium, the apparatus identification information being unique to the optical recording apparatus, a second identification step for identifying whether the apparatus identification information recorded in the optical recording medium, if it is identified that the apparatus identification information has been recorded in the first identification step, agrees with the apparatus identification information unique to the apparatus, a first processing step for performing first processing when a first identification result is obtained which includes a result of a case where it is identified in the first identification step that the apparatus identification information is not recorded and a result of a case where it is identified in the second identification step that the recorded apparatus identification information does not agree with the apparatus identification information assigned to the optical recording apparatus, and a second processing step for performing second processing under at least one condition that a second identification result is obtained, the second identification result including a result of a case where it is identified in the first identification step that the apparatus identification information is recorded and a result of a case where it is identified in the second identification step that the recorded apparatus identification information agrees with the apparatus identification information assigned to the optical recording apparatus, wherein the first processing step includes a creation step for creating power calibration information by performing power calibration processing and a setting step for setting laser light power based on the power calibration information created in the creation step, and wherein the second processing step includes a step for setting laser light power based on the power calibration information recorded in the optical recording medium.

A second laser power setting method comprises a first identification step for identifying whether recording medium identification information assigned to an optical recording medium is stored in storage means of an optical recording apparatus, the recording medium identification information being unique to the optical recording medium, a second identification step for identifying whether the recording medium identification information recorded in the optical recording medium, if it is identified that the recording medium identification information has been stored in the first identification step, agrees with recording medium identification information stored in the storage means, a first processing step for performing first processing when a first identification result is obtained which includes a result of a case where it is identified in the first identification step that the recording medium identification information is not stored and a case where it is identified in the second identification step that the recorded recording medium identification information does not agree with the recording medium identification information assigned to the optical recording medium, and a second processing step for performing second processing under at least one condition that a second identification result is obtained, the second identification result including a result of a case where it is identified in the first identification step that the recording medium identification information is stored and a result of a case where it is identified in the second identification step that the stored recording medium identification information agrees with the recording medium identification information assigned to the recording medium, wherein the first processing step includes a creation step for creating power calibration information by performing power calibration processing and a setting step for setting laser light power based on the power calibration information created in the creation step, and wherein the second processing step includes a step for setting laser light power based on the power calibration information stored in the storage means.

An optical recording apparatus related to the present invention comprises an optical pickup for irradiating an optical recording medium with laser light to record or reproduce a signal, drive means for driving the optical pickup to emit the laser light, storage means for storing apparatus identification information unique to the apparatus, and control means for controlling operations of the optical pickup and the drive means, wherein the control means allows for identifying whether the apparatus identification information is recorded in the optical recording medium, when it is determined that the apparatus identification information is recorded, identifying whether the apparatus identification information recorded in the optical recording medium agrees with apparatus identification information unique to the apparatus, performing first processing when a first identification result is obtained which includes a result of a case where it is identified that the apparatus identification information is not stored and a result of a case where it is identified that the recorded apparatus identification information does not agree with the apparatus identification information assigned to the optical recording apparatus, and performing second processing under at least one condition that a second identification result is obtained, the second identification result including a result of a case where it is identified that the apparatus identification information is recorded and a result of a case where it is identified that the recorded apparatus identification information agrees with the apparatus identification information assigned to the optical recording apparatus, wherein in the first processing, power calibration information is created performing power calibration processing and, based on the created power calibration information, laser light power is set, and wherein in the second processing, laser light power is set based on power calibration information recorded in the optical recording medium.

A second optical recording apparatus comprises an optical pickup for irradiating an optical recording medium with laser light to record or reproduce a signal, drive means for driving the optical pickup to emit the laser light, storage means for storing recording medium identification information unique to the optical recording medium, and control means for controlling operations of the optical pickup and the drive means, wherein the control means allows for identifying whether the recording medium identification information is stored in the storage means, when it is determined that the recording medium identification information is recorded, identifying whether the recording medium identification information recorded in the optical recording medium agrees with the recording medium identification information stored in the storage means, performing first processing when a first identification result is obtained which includes a result of a case where it is identified that the recording medium identification information is not recorded and a result of a case where it is identified that the stored recording medium identification information does not agree with the recording medium identification information assigned to the optical recording medium, and performing second processing under at least one condition that a second identification result is obtained, the second identification result including a result of a case where it is identified that the recording medium identification information is stored and the stored recording medium identification information agrees with the recording medium information assigned to the optical recording medium, and wherein in the first processing, power calibration information is created performing power calibration processing and, based on the created power calibration information, laser light power is set, and wherein in the second processing, laser light power is set based on power calibration information stored in the storage means.

According to the present invention, where information is recorded in an optical recording medium by an optical recording apparatus, recording medium identification information of the optical recording medium and recording medium identification information stored in the optical recording apparatus are compared to each other or apparatus identification information recorded in the optical recording medium and apparatus identification information assigned to the optical recording apparatus are compared to each other, so that if a comparison result of these pieces of identification information indicates that the optical recording medium has never been used, power calibration processing is performed to create power calibration information and, based on this power calibration information, laser light power is set.

Further, where it is identified from the comparison result that the optical recording medium has once been used or where the optical recording medium is identified to have once been used and already created power calibration information is identified to meet information validation conditions, based on this created power calibration information, laser light power is set. If it is identified that the information validation conditions are not met, on the other hand, the laser light power is set on the basis of power calibration information created by the power calibration processing. Furthermore, when the power calibration processing is performed, created power calibration information and apparatus identification information are recorded in the optical recording medium or the created power calibration information and recording medium identification information are stored in the optical recording apparatus.

According to the present invention, recording medium identification information of the optical recording medium and recording medium identification information stored in the optical recording apparatus are compared to each other or apparatus identification information recorded in the optical recording medium and apparatus identification information assigned to the optical recording apparatus are compared to each other, so that based on a comparison result of these pieces of identification information, performing of power calibration processing is controlled. Therefore, if the optical recording medium has once been used, already created power calibration information can be utilized to start a recording operation immediately in an optimal state.

If the optical recording medium has not been used, on the other hand, the power calibration processing is performed, so that the created power calibration information and the apparatus identification information are recorded in the optical recording medium or the created power calibration information and the recording medium identification information are stored in the optical recording apparatus. Therefore, when the same optical recording medium is used again, it is possible to identify whether the optical recording medium has once been used correctly.

Furthermore, information validation conditions are set to power calibration information, so that if the information validation conditions are not met, the power calibration processing is performed. Therefore, before such a case occurs that a recording operation cannot be performed in an optimal state using already created power calibration information, the power calibration processing is performed to update the power calibration information, thereby always performing the recording operation in the optimal state.

BEST MODE FOR CARRYING OUT THE INVENTION

Figure 1:
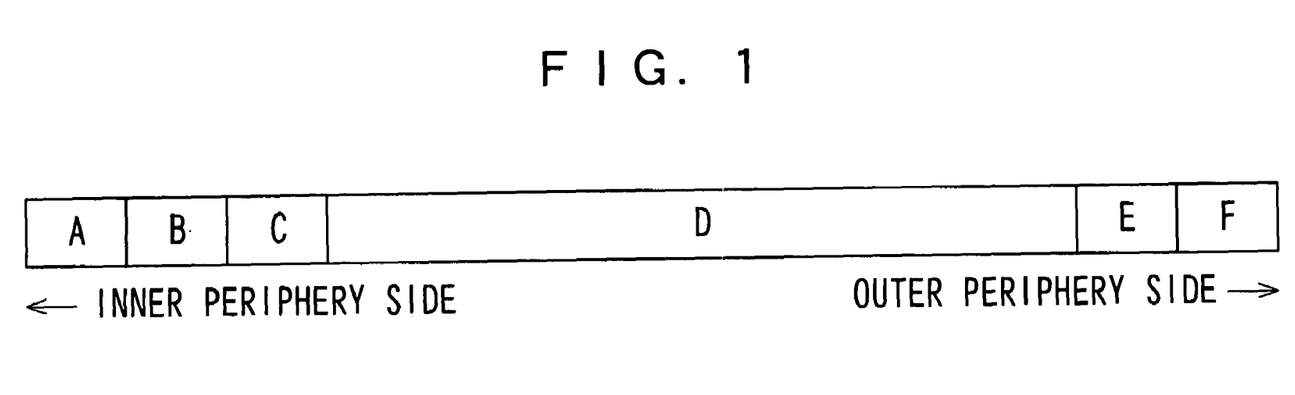
FIG. 1 is a diagram for showing a configuration of a disc.
Figure 2:
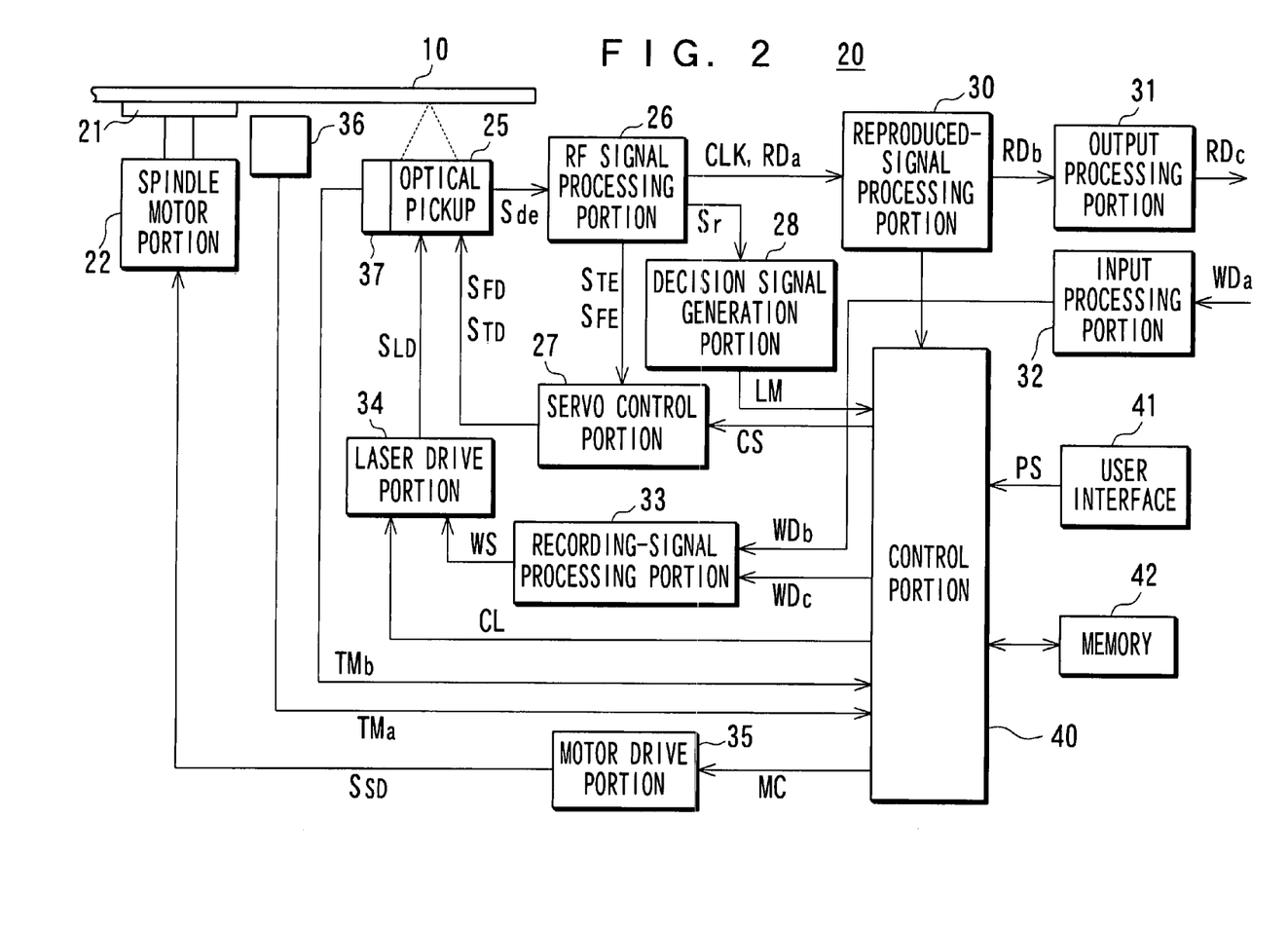
FIG. 2 is a block diagram for showing a configuration of an optical recording apparatus.

The following will describe embodiments of the present invention with reference to drawings. FIG. 1 shows an optical recording medium, for example, an optical disc (hereinafter referred to as "disc"), in which a signal is recorded using laser light and FIG. 2 shows a configuration of an optical recording apparatus for recording a signal using the disc shown in FIG. 1.

In FIG. 1, on an inner periphery side of a disc 10, a trial-writing region A is provided. This trial-writing region A is used to record a test signal and reproduce this recorded test signal, thereby determining optimal laser light power. On an outer periphery side of the trial-writing region A, a buffer region B is provided. The buffer region B is provided to record information etc. that indicates a recording position in a case where a signal is recorded.

Furthermore, on an outer periphery side of the buffer region B, there are provided a lead-in region C for recording table of contents (TOC) data, a program region D for recording a signal, and a lead-out region E for indicating an outermost periphery of the recording region toward the outer periphery in this order. Further, an outer periphery side of the lead-out region E provides an outer periphery region F.

Note here that a layout of these regions on the disc 10 is just illustrative and not restrictive. For example, the trial-writing region A, the buffer region B, etc. may be provided from the outer periphery side in this order. Further, of course these regions may be replaced in order.

Next, an optical recording apparatus 20 is described. In FIG. 2, the removable disc 10 mounted on a turntable 21 is driven rotationally by a spindle motor 22. Note here that the spindle motor 22 is driven so that a rotational speed of the disc 10 may become a desired speed by a spindle drive signal SSD obtained from a motor drive portion 35 described later.

An optical pickup 25 comprises a laser light emission device for irradiating the disc 10 with laser light, a photo-detector for receiving laser light reflected by a signal face of the disc 10 to generate an electrical signal that corresponds to the reflected light, an objective lens for reflecting laser light to a desired position on the signal face of the disc 10 correctly, an actuator for driving an objective lens, etc. This optical pickup 25 irradiates the disc 10 with laser light having a controlled light quantity. The laser light reflected by the disc 10 is applied to a photo-detection/processing circuit (not shown) of the optical pickup 25. The photo-detection/processing circuit performs photoelectric transfer, current/voltage conversion, etc. to generate a photo-detection signal Sde based on the reflected light and supply it to an RF signal processing portion 26. Further, the photo-detection/processing circuit monitors laser light power to generate a power monitor signal Spm and supply it to a laser drive portion 34 described later.

The RF signal processing portion 26 generates a read-out signal Sr based on the photo-detection signal Sde and performs waveform shaping, binarization, etc. of this read-out signal Sr to generate a clock signal CLK and a reproduced signal RDa and supply them to a reproduced-signal processing portion 30. Further, it generates a tracking error signal STE and a focus error signal SFE based on the photo-detection signal Sde and supply them to a servo control portion 27. Further, it supplies the read-out signal Sr to a decision signal generation portion 28.

Based on the supplied focus error signal SFE, the servo control portion 27 generates a focus drive signal SFD to drive an objective lens (not shown) of the optical pickup 25 so that a focal position of the laser light may be set on the signal face of the disc 10 and supplies it to the actuator of the optical pickup 25 (not shown). Further, based on the supplied tracking error signal STE, the servo control portion 27 generates a tracking drive signal STD for driving the objective lens of the optical pickup 25 so that an irradiation position by the laser light may be set on a midpoint of a desired track and supplies it to the actuator. Furthermore, since a tracking servo range of the optical pickup 25 is restricted, the servo control portion 27 generates a thread drive signal to move the optical pickup 25 in a radial direction of the disc 10 so that a signal recording or read-out position may provide the tracking servo range and supplies it to a thread drive circuit (not shown). Further, based on a servo control signal CS obtained from a control portion 40, the servo control portion 27 controls servo operations. For example, the servo control portion 27, when mounted with the disc 10, performs a focus research operation based on the servo control signal CS obtained from the control portion 40 to detect a position of the objective lens where the focal point of the laser light may be set on the signal face of the disc 10 and starts a focus servo operation. Further, to move a signal read-out position, the servo control portion 27 temporarily stops the tracking servo operation based on the servo control signal CS obtained from the control portion 40 and jumps tracks to move the signal read-out position rapidly in a radial direction.

The reproduced-signal processing portion 30 uses the clock signal CLK to perform such processing as demodulation, de-interleaving, error-correcting, etc. on the reproduced signal RDa and supplies a post-processing signal RDb to an output processing portion 31. Further, a signal RDb obtained by reading a signal present in a predetermined region of the disc 10 or a signal indicating an address position is supplied to the control portion 40.

The output processing portion 31 performs decode-processing on the supplied signal RDb if it is a signal obtained by encoding images or voice. Furthermore, the output processing portion 31 outputs a signal obtained by decode-processing as an output signal RDc given in a predetermined output format. Further, if the signal RDb is not an encoded signal, the output processing portion 31 outputs a signal supplied from the reproduced-signal processing portion 30 as the output signal RDc given, in the predetermined format. Furthermore, if the supplied signal is a data signal of computer software etc., the output processing portion 31 outputs a signal supplied from the reproduced-signal processing portion 30 as it is.

An input processing portion 32, when supplied with an input signal WDa of images or voice, encodes this input signal WDa to reduce its signal quantity and supplies an encoded signal as a signal WDb to a recording-signal processing portion 33. Further, not to reduce the signal quantity, the input processing portion 32 supplies the input signal WDa as the signal WDb to the recording-signal processing portion 33. Further, if the input signal WDa is not given in the predetermined format, the input processing portion 32 converts a format of the input signal WDa and supplies a converted signal as the signal WDb to the recording-signal processing portion 33. Furthermore, if data of computer software etc. is supplied as the input signal WDa, the input processing portion 32 supplies this data signal as the input signal WDa to the recording-signal processing portion 33.

The recording-signal processing portion 33 performs such processing as modulation, interleaving, error-correcting code calculation and addition, etc. on the signal WDb supplied from the input processing portion 32, to generate a recording signal WS. Further, when supplied with a test signal WDc for power calibration from the control portion 40, the recording-signal processing portion 33 generates the recording signal WS based on this test signal WDc and supplies it to a laser drive portion 34.

The decision signal generation portion 28 generates, based on the supplied read-out signal Sr, a decision signal LM, which makes it possible to determine whether a signal has been written at appropriate laser power. For example, if a predetermined pattern signal is recorded by varying laser light power and this recorded pattern signal is reproduced, a maximum level and a minimum level of a signal obtained in reproduction fluctuate in accordance with the laser light power. Therefore, a signal level of the read-out signal Sr is detected and a signal that indicates this signal level is supplied as the decision signal LM to the control portion 40.

The laser drive portion 34 generates a laser drive signal SLD and supplies it to the laser light emission device of the optical pickup 25 to thereby control the laser light power with which the disc 10 is irradiated. In this case, the laser drive portion 34 generates the laser drive signal SLD so that the laser light power based on a laser power set value CL supplied from, for example, the control portion 40 may be switched in accordance with the recorded signal WS supplied from the recorded-signal processing portion 33.

A temperature sensor 36 measures a temperature of the disc 10 or a space near the disc 10 and supplies the control portion 40 with a sensor signal TSa that indicates a measurement result. The temperature sensor 37 measures a temperature of the laser light emission device and supplies the control portion 40 with a sensor signal TSb that indicates a measurement result.

The motor drive portion 35 generates the spindle drive signal SSD based on a motor control signal MC supplied from the control portion 40 and supplies it to the spindle motor 22.

To the control portion 40, a user interface 41 is connected. The user interface 41 generates a control signal PS in accordance with user operations and supplies it to the control portion 40. Alternatively, the user interface receives a remote-control signal in accordance with user operations and supplies it as the control signal PS to the control portion 40. Further, the user interface 41 receives a signal, which controls operations of the optical recording apparatus from an external device, and supplies it as the control signal PS to the control portion 40.

The control portion 40 controls operations of the various portions based on the control signal PS supplied from the user interface 41, to set the operations of the optical recording apparatus in an operation mode that is in accordance with user operations, etc. Further, the control portion 40 generates a laser power set value CL for setting laser light power in accordance with the operation mode and supplies it to the laser drive portion 34.

Further, in power calibration processing, the control portion 40 generates the laser power set value CL so as to change laser light power continuously or stepwise and supplies it to the laser drive portion 34 and supplies the test signal WDc to the recorded-signal processing portion 33 to perform trial writing in the trial writing region A or the outer periphery region F. Furthermore, the control portion 40 determines a laser power set value CLA at which the laser light power is optimized on the innermost periphery side based on the decision signal LM supplied from the decision signal generation portion 28 when the test signal WDc in the trial writing region A is reproduced and determines a laser power set value CLF at which the laser light power is optimized on the outermost periphery side based on the decision signal IM supplied from the decision signal generation portion 28 when the test signal WDc in the outer periphery region F is reproduced.

Furthermore, the control portion 40 provides identification information that allows for identifying whether a disc of interest has once been used, and power calibration information generated by using determined laser power set value and various pieces of information obtained when power calibration processing is performed, to the disc or the optical recording apparatus. For example, apparatus identification information assigned uniquely to, for example, the optical recording apparatus and power calibration information are recorded in a predetermined region of the disc 10. Alternatively, recording medium identification information assigned uniquely to the disc and power calibration information are stored in a memory 42 in such a manner that they may correspond to each other.

This apparatus identification information is comprised of an ID for identifying, for example, a developer and manufacturer of an apparatus, a model name of the apparatus, a serial number of the apparatus, etc. The recording medium identification information is comprised of an ID for identifying a developer and manufacturer of, for example, a disc, a product name of the disc, a serial number of the disc, etc. Further, in a case where fluctuations are small in a production lot of a disc, a production lot number etc. of the disc may be used. The power calibration information is comprised of a laser power set value, information for determining a change-over-time in properties of the laser light emission device (e.g., elapsed operating time of the laser light emission device, date, etc. when power calibration processing is performed), information about an operating environment of the laser light emission device (e.g., temperature of the laser light emission device), information indicating intrinsic properties of the laser light emission device, etc. Furthermore, information about properties of the disc etc. may be used.

Further, the apparatus identification information is to be stored beforehand in a nonvolatile memory equipped to, for example, the control portion 40 so that general users cannot rewrite the information. Furthermore, if the optical pickup is replaced to accommodate services, by updating the apparatus identification information stored in the nonvolatile memory, power calibration information can always be held in a proper state.

The recording medium identification information can be recorded at any position as far as the optical recording apparatus can read it there, such as an innermost periphery side or outermost periphery side region, a lead-in region, a program region, etc. of a disc. Further, by recording the recording medium identification information near a position which is irradiated with laser light in a place of the optical pickup which is set first when the optical recording apparatus starts its operations, it is possible to read this information without moving this optical pickup 25 radially, thereby immediately identifying whether a disc of interest has once been used.

Furthermore, such a disc 10 as to have a memory embedded in it may be used as the optical recording medium or the disc 10 may be contained in a cartridge provided with a memory, to constitute the optical recording medium. Further, by providing a memory as well as a wireless transmission/reception circuit, information can be recorded and reproduced in a non-contact operation, thereby identifying whether the disc of the interest has once been used only by mounting the optical recording medium to the optical recording apparatus without rotating the disc 10.

The control portion 40 determines whether power calibration processing is necessary based on identification information or power calibration information attached to the memory 42 or the disc 10 and, if such is the case, performs the power calibration processing. Further, in recording of a signal, it sets laser light power based on power calibration information attached to the memory 42 or the disc 10 or laser power set values CIA and CLF of power calibration information generated by performing the power calibration processing. Note here that the control portion 40 generates the servo control signal CS to control operations of the servo control portion 27.

Next, operations of the optical recording apparatus will be described. If a signal is recorded on the disc 10, the optical recording apparatus 20 identifies whether the disc 10 has once been used and, when it has never been used, the calibration processing is performed utilizing the disc 10, thereby determining a laser power set value, which optimizes laser light power. Then, this determined laser power set value is used to perform recording. If it has once been used, an already set laser power set value is used to start recording, omitting the power calibration processing.

Further, emission properties of the laser light emission device vary with, for example, an operating temperature, an elapsed operating time, etc. Therefore, information validation conditions are set so that variations of laser light power owing to the operating temperature, the elapsed operating time, etc. may fall in a desired range, so that if power calibration information fails to meet any information validation conditions, a laser power set value contained in the power calibration information is invalidated to perform the power calibration processing again, thereby updating the laser power set value.

Figure 3:
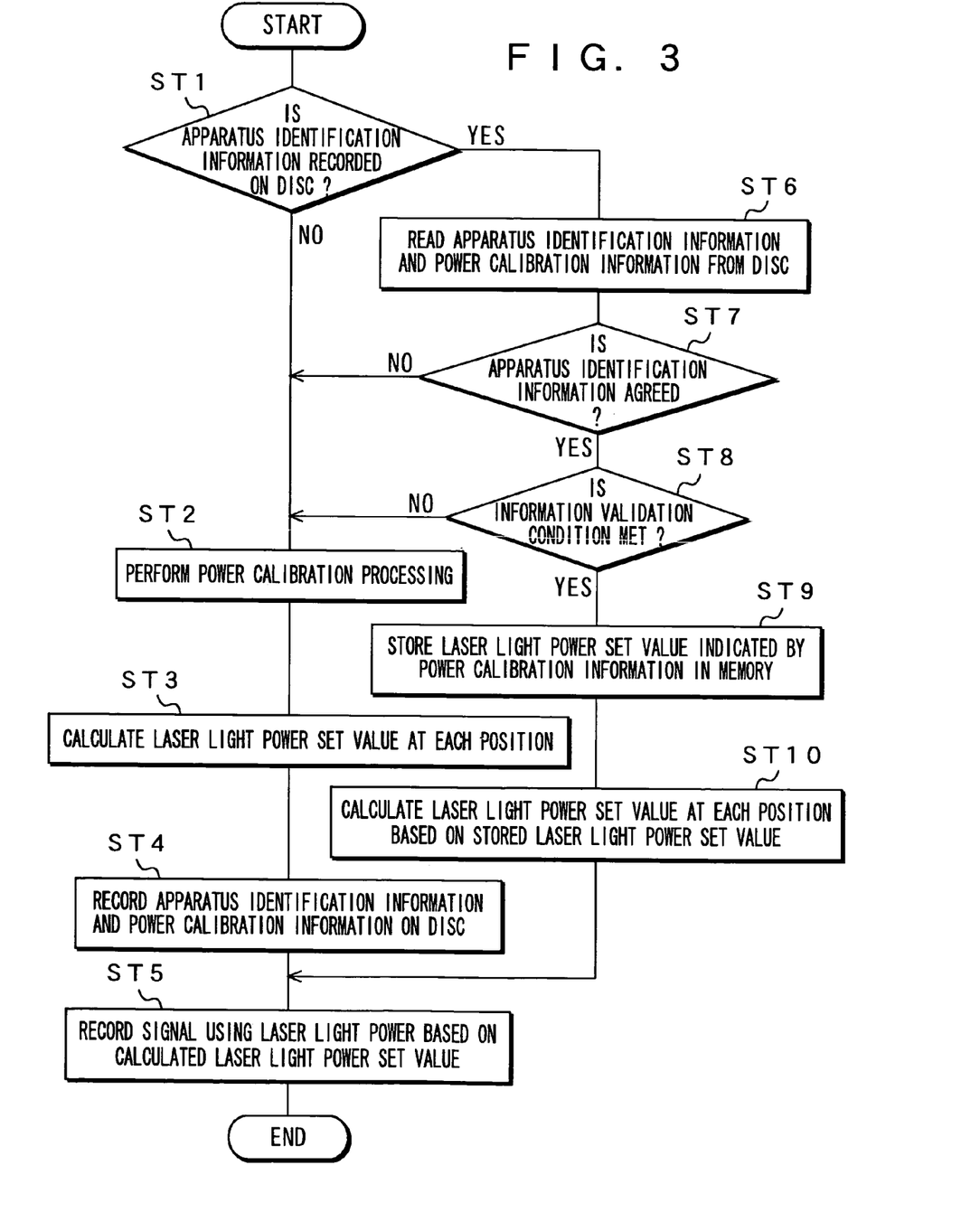
FIG. 3 is a flowchart for showing a first embodiment.

FIG. 3 is a flowchart for showing a first embodiment of the operations of the optical recording apparatus. According to this first embodiment, identification information used to identify whether the disc 10 has once been used and power calibration information are recorded on the disc 10, so that the optical recording apparatus utilizes the information recorded on the disc 10 to thereby set laser light power.

The control portion 40 of the optical recording apparatus identifies whether apparatus identification information is recorded in a predetermined region of the disc 10 at step ST1. In this case, to use the disc 10 for the first time, the process goes to step ST2 because no apparatus identification information is recorded.

At step ST2, power calibration processing is performed to set a laser power set value that optimizes laser light power and stores this laser power set value in the memory 42.

In this power calibration processing, the control portion 40 controls operations of the servo control portion 27, the recording signal processing portion 33, the laser drive portion 34, the motor drive portion 35, etc., to record the test signal WDc in the trial writing region A of the disc 10 when it is being driven rotationally at a desired speed. Further, when the test signal WDc is recorded, the laser power set value is changed continuously or stepwise to vary the laser light power.

Next, the control portion 40 performs control processing for reproducing the recorded test signal WDc and sets a laser power set value at a time when the best signal has been obtained based on the decision signal LM supplied from the decision signal generation portion 28 as an optimal laser power set value CIA on the inner periphery side. This optimal laser power set value CLA on the inner periphery side is stored in the memory 42.

When the operations for setting the laser power set value on the targeted inner periphery side are finished, the optical pickup 25 is moved toward the outer periphery side, so that as in the case of the inner periphery side, it records and reproduces the test signal WDc and sets a laser power set value at a time when the best signal has been obtained based on the decision signal LM as an optimal laser power set value CLF on the outer periphery side. This optimal laser power set value CLF on the outer periphery side is stored in the memory 42.

At step ST3, the inner periphery side laser power set value CLA and the outer periphery side laser power set value CLF, which are stored in the memory 42, are used to calculate a laser power set value CL at each position in a radial direction of the disc 10. If the laser power set value CL at each position is calculated on the basis of a calculation equation set in accordance with recording properties of the disc 10, an optimal laser power set value CL can be obtained. The recording properties of the disc 10 can be determined on the basis of a change in the test signal, which has been recorded in the trial writing region A beforehand. Alternatively, the recording properties may be determined by reading data, which has been set for each disc manufacturer and recorded on the disc.

At step ST4, it controls operations of the servo control portion 27, the recording signal processing portion 33, the laser drive portion 34, the motor drive portion 35, etc. and records apparatus identification information and power calibration information on the disc 10. By thus recording the apparatus identification information on the disc 10, it is possible to correctly identify whether the disc has once been used.

The power calibration information is created using various pieces of information obtained when the power calibration processing is performed as described above, the power calibration information comprising, for example, dates and times when the power calibration processing has been performed, an elapsed operating time of the laser light emission device at a time when the power calibration processing has been performed, a temperature TMa of the disc 10 or a neighborhood of the disc 10 and a temperature TMb of the optical pickup 25, an inner periphery side laser power set value CLA and an outer periphery side laser power set value CLF, information about the laser light emission device, etc.

The apparatus identification information and the power calibration information are recorded in a predetermined region of the disc 10, for example, the trial writing region A or the outer periphery region F. Note here that the recording region is not limited to these but a predetermined region may be previously allocated in, for example, the program region to record it in the region. By thus determining the recording region beforehand, the apparatus identification information and the power calibration information can be read immediately. Further, if positions where the apparatus identification information and the power calibration information are recorded can be managed, of course they can be recorded at any positions in a blank area on the disc.

At step ST5, the laser power set value CL at each position in a radial direction of the disc calculated from the laser power set value CIA of the inner periphery side and the laser power set value CLF of the outer periphery side are supplied to the laser drive portion 34 in accordance with the signal recording position, thereby recording the signal in the program region D using laser light power based on this laser power set value CL. In this case, the signal recording position can be determined easily by reading address information which is given in wobbles, pits, etc. on the disc 10. Further, in accordance with the radial position of the optical pickup 25, the corresponding laser power set value CL may be supplied to the laser drive portion 34.

Further, if the temperature of the optical pickup 25 changes during recording of the signal, the power or wavelength of the laser light changes, thereby changing the recording properties of the disc 10. Further, the recording properties change even with a change in temperature of the disc 10. Therefore, the control portion 40 corrects the laser power set value CL based on the sensor signals TSa and TSb. By thus correcting the laser power set value CL, it is possible to continue signal recording at optimal laser light power.

Furthermore, by recording information data etc. that indicates recording positions of the signal etc. in the buffer region B or the lead-in region C when the recording operation has finished, this recorded information can be utilized to easily set a position at which the next recording operation starts.

If the disc 10 has once been used, it means that the apparatus identification information and the power calibration information have been recorded on the disc 10 at step ST4. Therefore, the process goes from step ST1 to step ST6 to read the apparatus identification information and the power calibration information recorded on the disc 10 and goes to step ST7.

At step ST7, it identifies whether the read apparatus identification information agrees with apparatus identification information of an optical recording apparatus that uses this disc 10. In this case, if the disc has once been used, these pieces of apparatus identification information agree with each other, so that the process goes to step ST8. Further, if the disc 10 has once been used in any other optical recording apparatus, apparatus identification information assigned to this optical recording apparatus is recorded. Therefore, the read apparatus identification information and the apparatus identification information of the optical recording apparatus do not agree, so that the process goes from step ST7 to step ST2 to perform the power calibration processing again, thereby determining a laser power set value in accordance with the optical recording apparatus that uses the disc 10.

At step ST8, it determines whether the power calibration information meets any information validation conditions. If the information validation conditions are met, the process goes to step ST9 and, otherwise, returns to step ST2.

The information validation conditions have been set so that laser light power variations may fall in a desired range, as described above. Note here that the information validation conditions are set so that laser light power variations due to deterioration of the laser light element may fall in a desired range, including settings such as the number of days which have elapsed since the power calibration processing was performed and a difference in elapsed operating time between an elapsed operating time at a time when the power calibration processing was performed and a current elapsed operating time of the laser light emission device. Further, to contain laser light power variations due to temperature variations within a desired range, the settings include a difference in temperature between a temperature at a time when the power calibration processing was performed and a current temperature. Furthermore, the settings include conditions taking into account a difference in properties of the laser light emission device, such as a threshold value Hth of the operating temperature based on the intrinsic properties of the laser light emission device (e.g., Hth=Hre+kM is used, where Hre is a reference value, k is intrinsic properties of the laser light emission device, and M is a constant). Note here that the power calibration information contains such information as a date when the power calibration processing was performed, an elapsed operating time of the laser light emission device when the power calibration processing has been performed, and a temperature at which the power calibration processing was performed.

In this case, if the number of elapsed days or the difference in elapsed operating time exceeds a predetermined value, the temperature difference goes out of a predetermined range, or an operating temperature exceeds its threshold value, the information validation conditions may not be met, that is, the laser light power variations may go out of a desired range, so that the process goes to step ST2 to control the various portions so that the signal may be recorded after the laser power value is set again. If neither the number of elapsed days nor the difference in elapsed operating time exceeds the predetermined value and the temperature difference is within the predetermined range and the operating temperature does not exceed its threshold value, on the other hand, the information validation conditions are met, that is, the laser light power variations are within a desired range, so that the process goes to step ST9.

In such a manner, by establishing processing of step ST8, the calibration processing is performed automatically if the information validation conditions are not met, so that the signal can be recorded in a condition where the laser light power is optimized. For example, if laser light power deteriorates due to a variation in emission properties of the laser light emission device even when the laser light power is set on the basis of the laser power set values CLA and CLF, the calibration processing is performed automatically. It is thus possible to prevent the signal from being recorded on the disc 10 in a condition where laser light power is small, thereby recording the signal at optimal power.

Further, in a case where such a disc is used as to have a large allowance in laser light power variations at the time of signal recording or a laser light emission device that has small variations in laser light power is used, the signal can be recorded well without performing the power calibration processing as time passes by or as the temperature varies, so that processing of step ST8 may be omitted in such a case.

At step ST9, the laser power set value CLA of inner periphery side and the laser power set value CLF of outer periphery side, which have been recorded on the disc 10 at the above-mentioned step ST4, are read out and stored in the memory 42 and the process goes to step ST10.

At step ST10, a laser power set value CL at each position in a radial direction of the disc 10 as in the case of step ST3 is calculated from the laser power set value CIA of inner periphery side and the laser power set value CLF of outer periphery side, which have been stored in the memory 42. Then, the process goes to step ST5 to supply the laser drive portion 34 with the laser power set value CL in accordance with the signal recording position and record the signal.

In such a manner, if no apparatus identification information is recorded on the disc 10 or if the recorded apparatus identification information is different from apparatus identification information of the optical recording apparatus, the control portion 40 identifies that the disc 10 has not been used yet and performs power calibration processing and then records a signal. If the recorded identification information agrees with the apparatus identification information of the optical recording apparatus, on the other hand, it identifies that the disc 10 has once been used and records the signal utilizing the laser power set values contained in the power calibration information.

Therefore, by mounting the disc 10 to the optical recording apparatus 20 and performing the power calibration processing beforehand, information recorded on this disc can be utilized when this disc is used later, to immediately start recording, thereby greatly reducing time for waiting for start of signal recording. Further, since the waiting time can be reduced, it is unnecessary to provide a buffer memory etc. for holding a signal supplied during the power calibration processing, thereby constituting the optical recording apparatus inexpensively. Furthermore, if it is feared that properties of the laser light emission device may fluctuate as the optical recording apparatus is used or laser light power variations may go out of a desired range because the apparatus is used in an environment etc. having a different operating temperature, the power calibration processing is performed again to optimize the laser power set values, thereby enabling recording the signal in an optimal condition always.

Although the above embodiment has been described to record identification information and power calibration information on the disc 10, almost the same operations can be performed also by storing these pieces of information in the optical recording apparatus 20. The following will describe a case where these pieces of information are stored in the optical recording apparatus 20 according to a second embodiment, with reference to a flowchart of FIG. 4.

Figure 4:
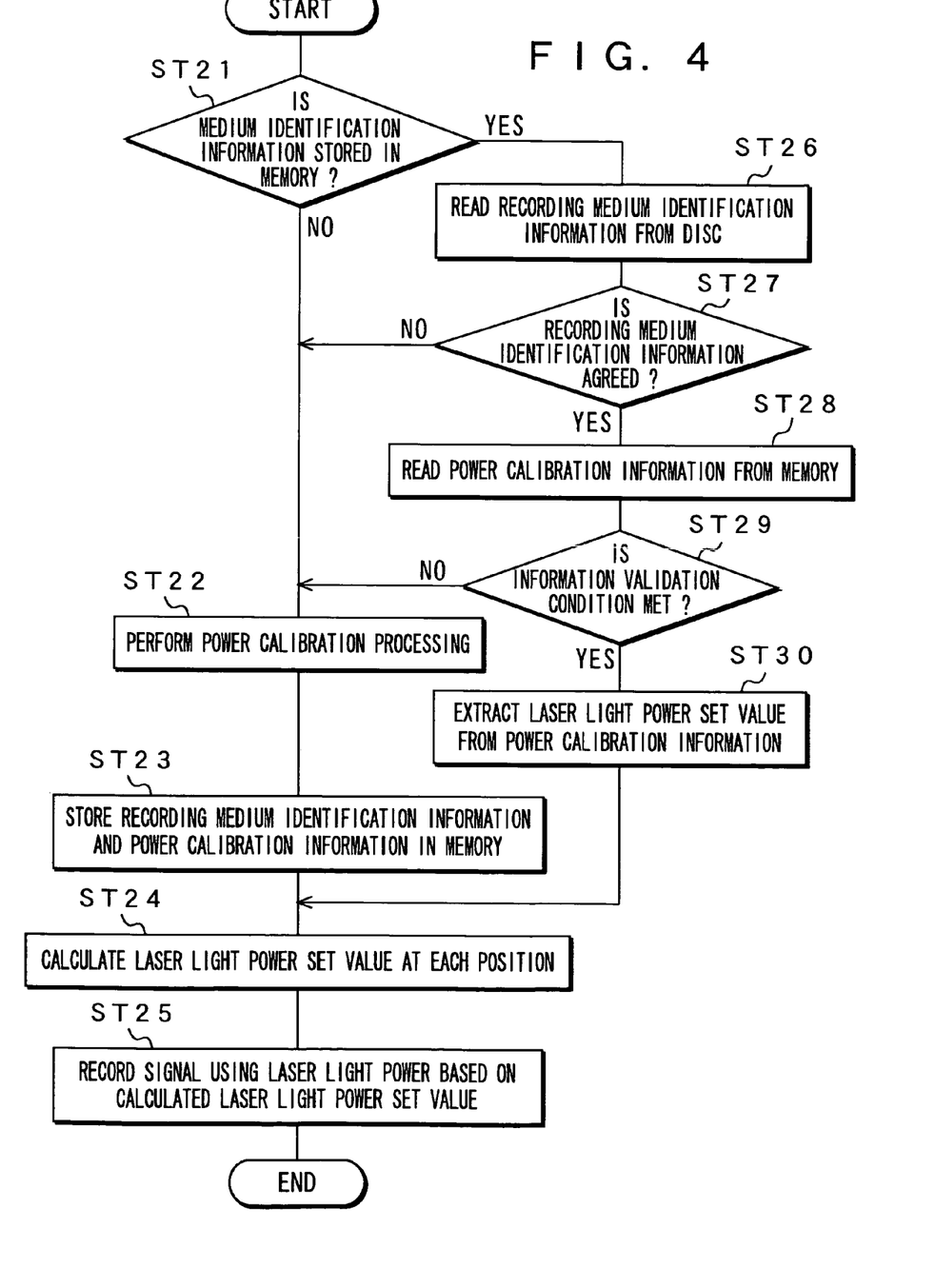
FIG. 4 is a flowchart for showing a second embodiment.

The control portion 40 identifies whether recording medium identification information is recorded in a memory 42 of an optical recording apparatus 20 at step ST21. In this case, if a disc 10 is used for the first time, no recording medium identification information is stored on this disc, so that the process goes to step ST22.

At step ST22, as in the case of the above-mentioned step ST2, the power calibration processing is performed to create power calibration information having an optimized laser power set value. This power calibration information is configured as in the case of the above-mentioned step ST4. At the next step ST23, the recording medium identification information and the power calibration information are stored in the memory 42 in such a manner that they may correspond to each other. By thus using the recording medium identification information, it is possible to correctly identify whether a disc of interest has once been used.

At step ST24, a laser power set value CL of each position in a radial direction of the disc 10 is calculated from a laser power set value CLA of inner periphery side and a laser power set value CLF of outer periphery side. At step ST25, as in the case of step ST5, the laser power set value CL at each position in the radial direction of the disc calculated from the power set value CLA of inner periphery side and the power set value CLF of outer periphery side is supplied to the laser drive portion 34 in accordance with a recording position of a signal, to record the signal in a program region D. Note here that at step ST25 also, it is possible to determine the recording position, etc. of the signal and correct the laser power set value CL as in the case of step ST5.

If the disc 10 has once been used, the recording medium identification information and the power calibration information are stored, at the above-mentioned step ST23, in the memory 42. Therefore, the process goes from step ST21 to step ST26.

At step ST26, the recording medium identification information recorded on the disc 10 is read out therefrom and the process goes to step ST27.

At step ST27, it identifies whether the recording medium identification information stored in the memory 42 agrees with the recording medium identification information read from the disc. In this case, if the disc has once been used, the recording medium identification information stored in the memory 42 agrees with it, so that the process goes to step ST28. If the disc has never been used, on the other hand, the recording medium identification information of the disc is not stored in the memory 42, so that the process goes to step ST22 to perform the power calibration processing. Then, the process performs processing for storing the recording medium identification information and the power calibration information in the memory 42 in such a manner that they may correspond to each other, calculates a laser power set value CL at each position, records the signal by using the calculated laser power set value CL, etc.

At step ST28, the power calibration information, which has been stored in such a manner as to correspond to the recording medium identification information determined to agree at step ST27, is read out and the process goes to step ST29.

At step ST29, as in the case of the above-mentioned step ST8, it determines whether the power calibration information meets any information validation conditions. If it meets the information validation conditions, the process goes to step ST30 and, otherwise, returns to step ST22. Note here that processing of step ST29 can be omitted like step ST8.

At step ST30, a laser power set value CLA of inner periphery side and a laser power set value CLF of outer periphery side are extracted from the read power calibration information and the process goes to step ST24 to calculate a laser power set value CL at each position in the radial direction of the disc 10 from the laser power set value CIA of inner periphery side and the laser power set value CLF of outer periphery side. Further, at step ST25, a signal is recorded using the laser light power based on this calculated laser power set value CL.

In such a manner, if no recording medium identification information is recorded in the memory 42 of the optical recording apparatus 20 or if the stored recording medium identification information does not agree with the recording medium identification information recorded on the disc, the process identifies that the disc has never been used and performs the power calibration processing and records the signal. If the stored recording medium identification information agrees with the recording medium identification information recorded on the disc, on the other hand, the process identifies that the disc has once been used and records the signal by utilizing the laser power set values CIA and CLF contained in the power calibration information stored in the memory 42 in such a manner that it may correspond to this coincident recording medium identification information.

Therefore, by mounting the disc 10 to the optical recording apparatus 20 and performing the power calibration processing beforehand, when the disc is used later, it is possible to immediately start recording by utilizing information stored in the memory, thereby greatly reducing time for waiting for the start of signal recording. Further, since the waiting time can be reduced, it is unnecessary to provide a buffer memory etc. for holding a signal supplied during the power calibration processing, thereby constituting the optical recording apparatus inexpensively. Furthermore, if it is feared that properties of the laser light emission device may fluctuate as the optical recording apparatus is used or laser light power variations may go out of a desired range because the apparatus is used in an environment etc. having a different operating temperature, the power calibration processing is performed again to optimize the laser power set values, thereby allowing for recording the signal in an always optimal condition.

Although the above embodiment has been described to use an optical disc, of course, for example, the optical recording medium may be of a card type etc. as far as it is capable of recording by use of laser light.

INDUSTRIAL APPLICABILITY

The present invention can optimize laser light power immediately by utilizing already created power calibration information and so is well applicable to an optical recording apparatus using a removable recording medium.

The invention claimed is:

1. A laser power setting method comprising:
a first identification step for identifying whether apparatus identification information assigned to an optical recording apparatus is recorded in an optical recording medium, said apparatus identification information being unique to the optical recording apparatus;
a second identification step for identifying whether said apparatus identification information recorded in said optical recording medium, if it is identified that said apparatus identification information has been recorded in said first identification step, agrees with said apparatus identification information unique to said apparatus;
a first processing step for performing first processing when a first identification result is obtained which includes a result of a case where it is identified in said first identification step that said apparatus identification information is not recorded and a result of a case where it is identified in said second identification step that said recorded apparatus identification information does not agree with said apparatus identification information assigned to said optical recording apparatus; and
a second processing step for performing second processing under at least one condition that a second identification result is obtained, said second identification result including a result of a case where it is identified in said first identification step that said apparatus identification information is recorded and a result of a case where it is identified in said second identification step that said recorded apparatus identification information agrees with said apparatus identification information assigned to said optical recording apparatus,
wherein said first processing step includes a creation step for creating power calibration information by performing power calibration processing and a first setting step for setting laser light power based on the power calibration information created in said creation step; and
wherein said second processing step includes a second setting step for setting laser light power based on the power calibration information recorded in said optical recording medium.

2. The laser power setting method according to claim 1, further comprising a validation condition identification step for identifying whether the power calibration information recorded in said optical recording apparatus meets information validation condition, if it is identified in said second identification step that said apparatus identification information recorded in said optical recording medium agrees with said apparatus identification information unique to said apparatus,
wherein if it is identified in said validation condition identification step that said power calibration information meets said information validation condition, said first processing step is performed and, if it is identified that said power calibration information does not meet said information validation condition, said second processing step is performed.

3. The laser power setting method according to claim 2, wherein said information validation condition is set so that fluctuations of said laser light power change within a desired range.

4. The laser power setting method according to claim 1, wherein in said second processing step, said second processing is performed under a condition that a second identification result is obtained, said second identification result including a case where it is identified in said first identification step that said apparatus identification information is recorded and a case where it is identified in said second identification step that said recorded apparatus identification information agrees with apparatus identification information assigned to said optical recording apparatus.

5. The laser power setting method according to claim 1, further comprising a recording step for recording said power calibration information and apparatus identification information assigned to said optical recording apparatus in said optical recording medium.

6. A laser power setting method comprising:
a first identification step for identifying whether recording medium identification information assigned to an optical recording medium is stored in storage means of an optical recording apparatus, said recording medium identification information being unique to said optical recording medium;
a second identification step for identifying whether said recording medium identification information recorded in said optical recording medium, if it is identified that said recording medium identification information has been stored in said first identification step, agrees with recording medium identification information stored in said storage means;
a first processing step for performing first processing when a first identification result is obtained which includes a result of a case where it is identified in said first identification step that said recording medium identification information is not stored and a case where it is identified in said second identification step that said recorded recording medium identification information does not agree with said recording medium identification information assigned to said optical recording medium; and
a second processing step for performing second processing under at least one condition that a second identification result is obtained, said second identification result including a result of a case where it is identified in said first identification step that said recording medium identification information is stored and a result of a case where it is identified in said second identification step that said stored recording medium identification information agrees with said recording medium identification information assigned to said recording medium, wherein said first processing step includes a creation step for creating power calibration information by performing power calibration processing and a first setting step for setting laser light power based on the power calibration information created in said creation step; and wherein said second processing step includes a second step for setting laser light power based on the power calibration information stored in said storage means.

7. The laser power setting method according to claim 6, further comprising a validation condition identification step for identifying whether power calibration information stored in said storage means meets information validation condition, if it is identified in said second identification step that said apparatus identification information stored in said storage means agrees with apparatus identification information unique to said apparatus, wherein if it is identified in said validation condition identification step that said power calibration information meets said information validation condition, said first processing step is performed and, if it is identified that said power calibration information does not meet said information validation conditions, said second processing step is performed.

8. The laser power setting method according to claim 7, wherein said information validation condition is set so that fluctuations of said laser light power change within a desired range.

9. The laser power setting method according to claim 6, wherein in said second processing step, second processing is performed under a condition that a second identification result is obtained, said second identification result including a case where it is identified in said first identification step that said apparatus identification information is stored and a case where it is identified in said second identification step that said stored recording medium identification information agrees with said recording medium identification information assigned to said recording medium.

10. The laser power setting method according to claim 6, further comprising a storing step for storing said power calibration information and recording medium identification information assigned to said recording medium in said storage means.

11. An optical recording apparatus comprising:
an optical pickup for irradiating an optical recording medium with laser light to record or reproduce a signal;
drive means for driving said optical pickup to emit said laser light;
storage means for storing apparatus identification information unique to said apparatus; and
control means for controlling operations of said optical pickup and said drive means,
wherein said control means allows for:
identifying whether said apparatus identification information is recorded in said optical recording medium;
when it is determined that said apparatus identification information is recorded, identifying whether said apparatus identification information recorded in said optical recording medium agrees with apparatus identification information unique to said apparatus;
performing first processing when a first identification result is obtained which includes a result of a case where it is identified that said apparatus identification information is not stored and a result of a case where it is identified that said recorded apparatus identification information does not agree with said apparatus identification information assigned to said optical recording apparatus; and
performing second processing under at least one condition that a second identification result is obtained, said second identification result including a result of a case where it is identified that said apparatus identification information is recorded and a result of a case where it is identified that said recorded apparatus identification information agrees with said apparatus identification information assigned to said optical recording apparatus;
wherein in said first processing, power calibration information is created performing power calibration processing and, based on said created power calibration information, laser light power is set; and
wherein in said second processing, laser light power is set based on power calibration information recorded in said optical recording medium.

12. The optical recording apparatus according to claim 11, wherein said control means allows for:
identifying whether power calibration information recorded in said optical recording apparatus meets information validation condition if it is identified that said apparatus identification information recorded in said optical recording medium agrees with said apparatus identification information unique to said apparatus; and
performing said first processing if it is identified that said power calibration information meets said information validation condition and performing said second processing if it is identified that said power calibration information does not meet said information validation condition.

13. The optical recording apparatus according to claim 12, wherein said information validation condition is set so that fluctuations of said laser light power change within a desired range.

14. The optical recording apparatus according to claim 11, wherein said control means allows for performing said second processing under a condition that a second identification result is obtained, said second identification result including a case where it is identified that said apparatus identification information is recorded and a case where it is identified that said recorded apparatus identification information agrees with said apparatus identification information assigned to said optical recording apparatus.

15. The optical recording apparatus according to claim 11, wherein said control means allows for performing processing for recording said power calibration information and apparatus identification information assigned to said optical recording apparatus in said optical recording medium.

16. An optical recording apparatus comprising:
an optical pickup for irradiating an optical recording medium with laser light to record or reproduce a signal;
drive means for driving said optical pickup to emit said laser light;
storage means for storing recording medium identification information unique to said optical recording medium; and
control means for controlling operations of said optical pickup and said drive means, wherein said control means allows for:
- identifying whether said recording medium identification information is stored in said storage means;
- when it is determined that said recording medium identification information is recorded, identifying whether said recording medium identification information recorded in said optical recording medium agrees with said recording medium identification information stored in said storage means;
- performing first processing when a first identification result is obtained which includes a result of a case where it is identified that said recording medium identification information is not recorded and a result of a case where it is identified that said stored recording medium identification information does not agree with said recording medium identification information assigned to said optical recording medium; and
- performing second processing under at least one condition that a second identification result is obtained, said second identification result including a result of a case where it is identified that said recording medium identification information is stored and said stored recording medium identification information agrees with said recording medium information assigned to said optical recording medium; and
- wherein in said first processing, power calibration information is created performing power calibration processing and, based on said created power calibration information, laser light power is set; and
- wherein in said second processing, laser light power is set based on power calibration information stored in said storage means.

17. The optical recording apparatus according to claim 16, wherein said control means allows for:
- identifying whether power calibration information stored in said storage means meets information validation condition if it is identified that said recording medium identification information stored in said storage means agrees with said recording medium identification information unique to said optical recording medium; and
- performing said first processing if it is identified that said power calibration information meets said information validation condition and performing said second processing if it is identified that said power calibration information does not meet said information validation condition.

18. The optical recording apparatus according to claim 17, wherein said information validation condition is set so that fluctuations of said laser light power change within a desired range.

19. The optical recording apparatus according to claim 16, wherein said control means allows for performing said second processing under a condition that a second identification result is obtained, said second identification result including a case where it is identified that said recording medium identification information is stored and a case where it is identified that said stored recording medium identification information agrees with said recording medium identification information assigned to said optical recording medium.

20. The optical recording apparatus according to claim 16, wherein said control means allows for performing processing for storing said power calibration information and recording medium identification information assigned to said optical recording medium in said storage means.

* * * * *